United States Patent [19]

Cubukciyan et al.

[11] Patent Number: 5,321,784
[45] Date of Patent: Jun. 14, 1994

[54] PULL-PROOF, MODULAR FIBER OPTIC CONNECTOR SYSTEM

[75] Inventors: Nuran H. Cubukciyan, Englewood Cliffs, N.J.; Gordon D. Henson, Lake Elmo; Nicholas A. Lee, Woodbury, both of Minn.; Mark T. Stender, Red Bank, N.J.

[73] Assignee: Minnesota Mining and Manufacturing Company, St. Paul, Minn.

[21] Appl. No.: 19,075

[22] Filed: Feb. 18, 1993

[51] Int. Cl.$^5$ .............................. G02B 6/36
[52] U.S. Cl. ............................ 385/78; 385/87
[58] Field of Search ........................ 385/76-87

[56] References Cited

U.S. PATENT DOCUMENTS

| | | | |
|---|---|---|---|
| 3,904,269 | 9/1975 | Lebduska etal. | 350/96 C |
| 4,268,115 | 5/1981 | Slemon et al. | 350/96.21 |
| 4,579,418 | 4/1986 | Parchet et al. | 385/78 X |
| 4,634,214 | 1/1987 | Cannon, Jr. et al. | 350/96.20 |
| 4,673,242 | 6/1987 | Logan et al. | 350/96.20 |
| 4,687,291 | 8/1987 | Stape et al. | 350/96.21 |
| 4,812,009 | 3/1989 | Carlisle et al. | 350/96.21 |
| 4,898,446 | 2/1990 | Hinckley | 350/96.20 |
| 4,961,624 | 10/1990 | Savitsky et al. | 350/96.20 |
| 4,968,113 | 11/1990 | Bowen | 350/96.20 |
| 4,984,865 | 1/1991 | Lee et al. | 350/96.20 |
| 5,073,042 | 12/1991 | Mulholland et al. | 385/86 X |
| 5,101,463 | 3/1992 | Cubukciyan et al. | 385/72 |
| 5,121,455 | 6/1992 | Palecek | 385/69 |
| 5,134,677 | 7/1992 | Leung et al. | 385/84 |
| 5,151,960 | 9/1992 | Warner et al. | 385/53 |

OTHER PUBLICATIONS

Japanese Industrial Standard brochure C5973, "F04 Type Connectors for Optical Fiber Cords" (1990), 33 pages.

*Primary Examiner*—John D. Lee
*Attorney, Agent, or Firm*—Gary L. Griswold; Walter N. Kirn; Jack V. Musgrove

[57] ABSTRACT

A novel system for manufacturing a variety of fiber optic connectors which are compatible with existing connector formats, including FC, SC and ST push-pull connectors. The system includes a connector subassembly which is constructed of components common to each of the novel connector designs. The connector subassembly includes a ferrule and ferrule collar contained in a connector body, a spring biasing the collar toward the ferrule, a crimp ring for securing the strength members of the fiber optic cable to the connector body, and a boot for strain relief at the crimp location. Several different connector shells are provided for each of the connector formats, and the interior of the shells are adapted to be attached to the single connector body. In an alternative system, separate body/shells are provided which merge the common body with the different connector shells.

18 Claims, 3 Drawing Sheets

PULL-PROOF, MODULAR FIBER OPTIC CONNECTOR SYSTEM

BACKGROUND OF THE INVENTION

1. Field of the Invention

The present invention generally relates to connectors, and more particularly to connectors for optical fibers which terminate in ferrules, and a system for manufacturing such connectors, which includes several parts common to each connector.

2. Description of the Prior Art

The use of optical fibers for high speed communication and data transmission via optical signals has become well established. There are already hundreds of thousands of miles of optical fiber in use today. It has, therefore, become imperative to provide compatible optical fiber connectors which may easily be coupled and uncoupled, and a substantial development effort has been directed toward designing such connectors. As used herein, the term "connector" means an article which allows connection, disconnection and reconnection of two optical fibers, as opposed to a "splice," which normally connotes a permanent connection between the fibers.

One of the earliest connector designs to become standardized is the ST fiber optic connector ("ST" is a trademark of American Telephone & Telegraph Co.); see U.S Pat. No. 4,634,214. This design incorporates a bayonet-style fastener. In its simplest form, this type of fastener includes a coupling having one or more outwardly extending projections or lugs, and a rotatable, female socket having a spiral slot therein for receiving the lugs. The coupling may include an integral mounting plate for affixing the connector to a connection module, or the coupling may comprise a double-ended receptacle which mates with two male connector plugs (one on each end of the fiber). A further improvement relates to the manner in which the female socket is rotated about the coupling. It was found that such rotation could result in undesirable grinding of the fiber end faces during the connection operation. To prevent such grinding, the connector body (ferrule) may be provided with means for aligning the ferrule with the connector receptacle. An improved version of the ST connector, shown in U.S. Pat. No. 4,812,009, provides a boot/cap extender which imparts strain relief to the connector assembly.

Another variation, illustrated in FIG. 1, comprises a "push-pull" connector 1 which is compatible with existing ST receptacles. The connector of FIG. 1 generally includes a ferrule 2 held by a ferrule collar 3 which in turn is secured within a connector body or backbone 4. A spring 5 surrounds a portion of the ferrule collar within body 4. A bushing 6 assists in the insertion of the optical fiber into collar 3. The entire assembly is further located in a slidable housing or shell 7 which serves to actuate the latch members s integrally formed with body 4. A crimp ring 9 is used to attach the strength members (Kevlar strands) of the fiber optic cable to body 4. A boot 10 is also provided for strain relief. See U.S. Pat. No. 5,101,463.

A similar push-pull fiber optic connector which is in wide use today is known as the "SC" connector, first manufactured by Nippon Telegraph and Telephone Co. An exemplary embodiment of this connector is shown in FIG. 2. A more detailed description may be found in "Japanese Industrial Standard JIS C 5973 for FO4- Type Optical Fiber Connectors," published by the Japanese Standards Association. This design also utilizes a double-ended receptacle, but both the receptacle and the plug 11 have a rectangular cross-section. Plug 11 has many components similar to those of ST push-pull connector 1, including a ferrule 12, collar 13, spring 14, crimp ring 15 and boot 16. While all of these components are different in construction from those of connector 1, the most notable difference is in the body 17, shell 18 and slidable housing 19 of SC connector 11. As with connector 1, pulling on the fiber optic cable attached to SC connector 11 will not disengage the elements, since the cable is directly attached to body 17 which is not directly coupled to ferrule collar 13.

Another popular connector style is the FC connector, which is similar to the ST connector in that it includes a circular shell, but does not provide for bayonet-style fastening. The first FC connector 20 (FC-PC2) is illustrated in FIG. 3. As with the other two connectors detailed, FC-PC2 connector 20 includes a ferrule 21, a ferrule collar 22, a spring 23, a backbone 24, a shell 25, a crimp ring 26, boot 27 and outer housing 28. This design is both pull-proof and side-pull resistant, but it has many parts and is relatively difficult to install. A later version of the FC connector (FC-PC1) has a low part count and is easily installed, but it is not pull-proof or side-pull resistant.

Due to the dissimilarities in the myriad connector styles, it has become difficult to service areas where several different styles are used; there are already several million of each of these types of connectors in use. Although each of the foregoing designs has unique advantages, the designs are totally incompatible. Each design requires different connector components, installation tools and procedures. Special adaptor kits may be necessary to achieve compatibility, and it is similarly more trouble to obtain jumpers which have different connector designs at each end. The multiplicity of styles also needlessly increases the overall cost of producing a variety of connector designs; there are a total of 24 different components in the three illustrated connectors. It would, therefore, be desirable and advantageous to devise a ferrule connector design which is easily adapted to existing connector styles, but has a simplified construction to facilitate assembly and reduce manufacturing costs, and yet is pull-proof and side-pull resistant.

SUMMARY OF THE INVENTION

The present invention provides a novel ferrule connector having an extended ferrule collar and a surrounding body adapted to be received in one of several different connector shells. The ferrule collar and body comprise a sub-assembly which can be factory mounted to a fiber optic cable, such as a pigtail or jumper. The body may be modified to incorporate certain features which would otherwise be found in the shell. The shell may be attached in the field to provide instant compatibility with any one of several conventional connector styles, including ST, FC and SC.

The process of manufacturing several different connector styles is also simplified by the novel collar and body construction which greatly reduces the number of components required to assemble these specific connector styles. The use of common components also allows the use of a single set of tools to finish the cable assembly

BRIEF DESCRIPTION OF THE DRAWINGS

The novel features and scope of the invention are set forth in the appended claims. The invention itself, however, will best be understood by reference to the accompanying, drawings, wherein:

DESCRIPTION OF THE PREFERRED EMBODIMENT

Figure 4:
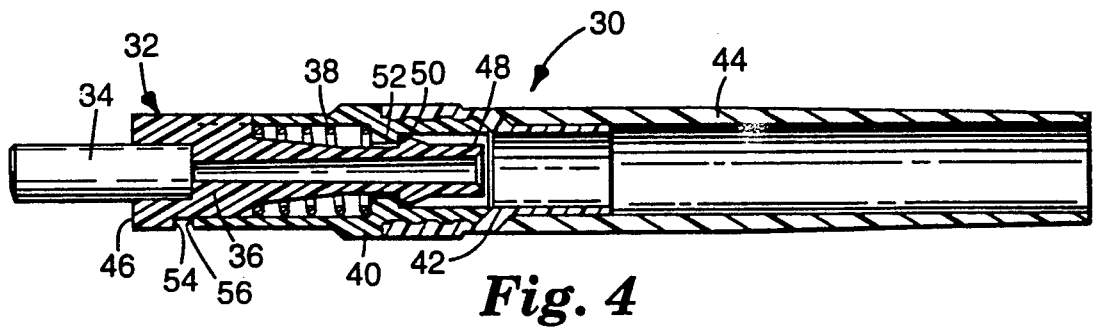
FIG. 4 is a cross-sectional side view of one embodiment of the ferrule subassembly of the present invention.

With reference now to the figures, and in particular with reference to FIG. 4, there is depicted the ferrule connector subassembly 30 of the present invention. Connector subassembly 30 is generally comprised of a ferrule/collar assembly 32, which includes a ferrule 34 and a ferrule collar 36, a spring 38, a connector backbone or body 40, a crimp ring 42 and a boot 44. As explained hereinafter, all of these components may be commonly used to provide modified versions of several different connector styles, including FC, SC and standard ST designs. Ferrule 34 is essentially identical to many prior art ferrules, having a very small hole therethrough for receiving the terminal end of an optical fiber, and is preferably constructed of ceramic such as zirconia or alumina. Collar 36 may be constructed of any durable material, preferably a polymer such as polyarylsulfone. Those skilled in the art will appreciate that connector subassembly 30 could be further simplified by combining ferrule 34 and collar 36 into a single, integrally molded part.

Figure 2:
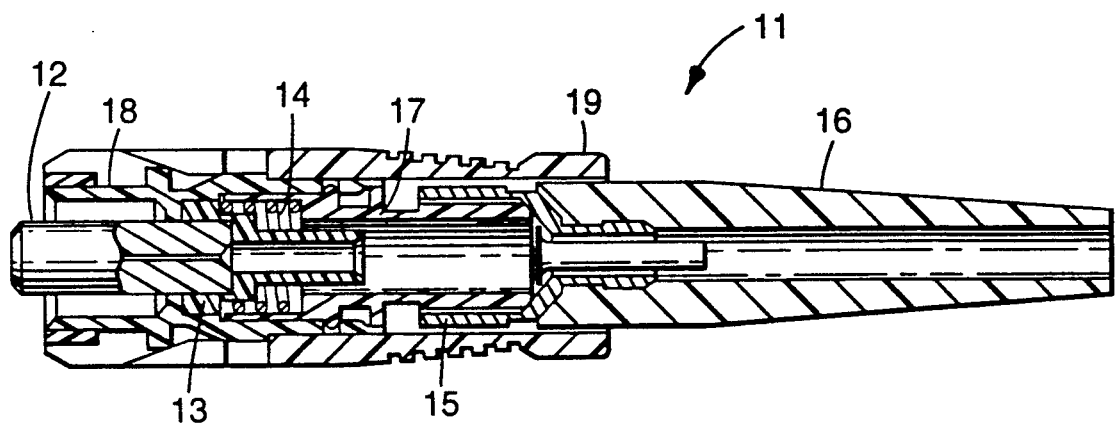
FIG. 2 is a cross-sectional side view of the prior art SC fiber optic connector.

Collar 36, which represents an improvement over prior art collars, is generally tubular, with one end 46 having an enlarged diameter to receive ferrule 34. Ferrule 34 may be attached to collar 36 in any convenient manner, such as with epoxy resin. The other end 48 of collar 36 also has an enlarged diameter, forming a flange 50. This flange secures collar 36 within body 40 by forcibly abutting another annular flange 52 formed along the inner surface of body 40. The outer diameter of flange 50 is only slightly larger, however, than the inner diameter of flange 52 so that end 48 may easily be inserted into body 40, thus providing a snap-fit. By providing this snap-through feature, there is no longer any need to restrain ferrule/collar assembly 32 against the spring load with a cross-pin (as in some prior art SC variations), nor is there any need to split the body of the connector into two components (as in FIG. 2).

Figure 1:
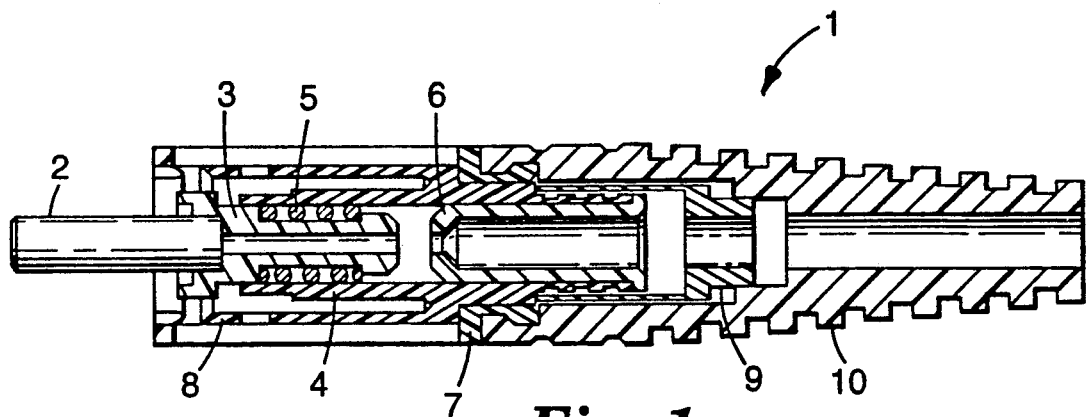
FIG. 1 is a cross-sectional side view of the prior art ST push-pull fiber optic connector.

The longitudinal hole in collar 36 has a variable diameter, small near ferrule 34 but larger at the opening of end 48. This funnel-shaped bore assists in the assembly process by guiding the terminal end of the fiber toward the hole in ferrule 34. In this regard, it will also be appreciated that end 48 of collar 36 terminates in approximately the same plane as the end of body 40; actually, end 48 is recessed about 1 mm inside of body 40. The extended length of collar 36 eliminates the need for an additional component (such as the bushing in FIG. 1) to guide the fiber into the ferrule assembly.

A shoulder 54 is also formed at end 46 of collar 36, to limit the rearward movement of assembly 32 within body 40. This is accomplished by precisely positioning shoulder 54 with respect to the forward end 56 of body 40. In making a connector pull-proof by spring loading the ferrule/collar assembly, the fiber must be allowed to move relative to the connector body, thereby risking potential buckling of the fiber. By carefully controlling the amount of rearward travel of ferrule/collar assembly 32, this buckling is minimized. Current designs (such as FIG. 2) do not limit such rearward movement, creating a serious potential for fiber failure.

Figure 5:
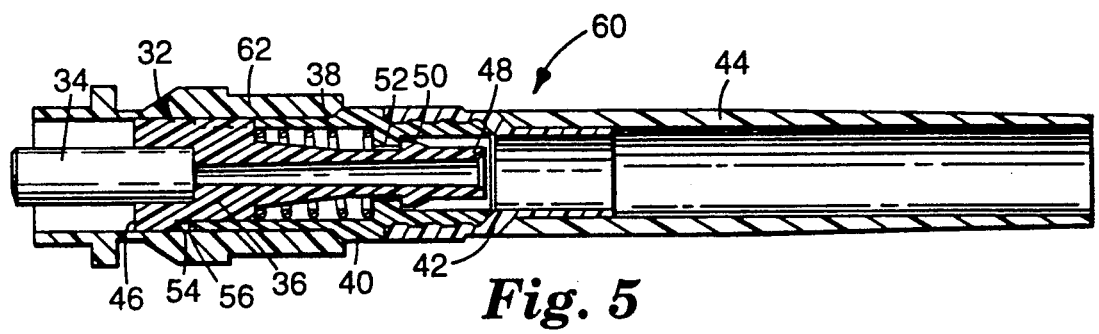
FIG. 5 is a cross-sectional side view of a modified SC connector using the subassembly of FIG. 4.
Figure 9:
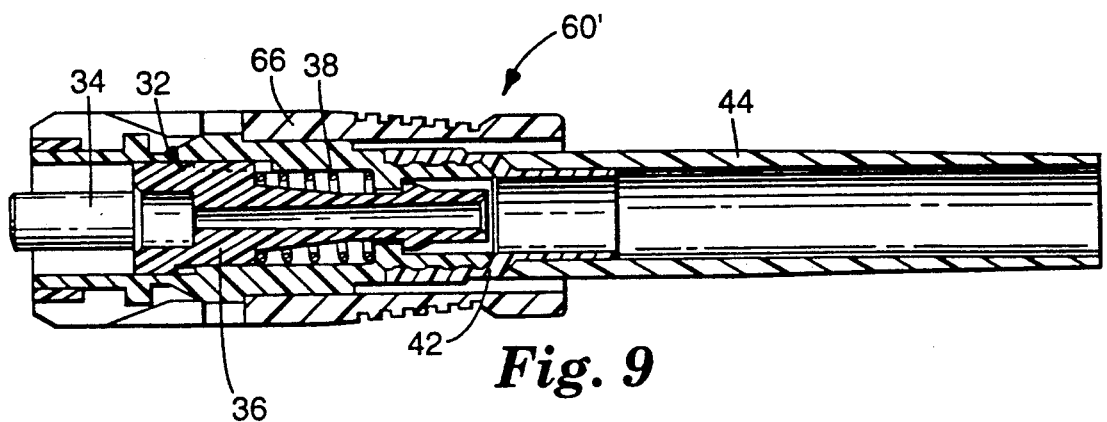
FIG. 9 is a cross-sectional side view of a modified SC connector using a different body from that of FIG. 5.

Connector subassembly 30 may be adapted to many different conventional connector formats by attaching one of several shells to body 40. Each shell is designed to mate with the novel construction of body 40. For example, FIG. 5 illustrates a modified SC connector 60 according to the present invention which utilizes all of the common components of connector subassembly 30. In fact, the only difference between FIGS. 4 and 5 is the addition of a novel SC coupling shell 62 (the outer shell housing, illustrated in FIG. 9, is omitted in FIG. 5). While the interior construction of shell 62 is dictated by the outer design of body 40, the exterior features of shell 62 are essentially identical to the features of the prior art shell 18 of FIG. 2. Shell 62 may be attached to body 40 by any convenient means, such as a mechanical snap-fit or adhesives.

Figure 3:
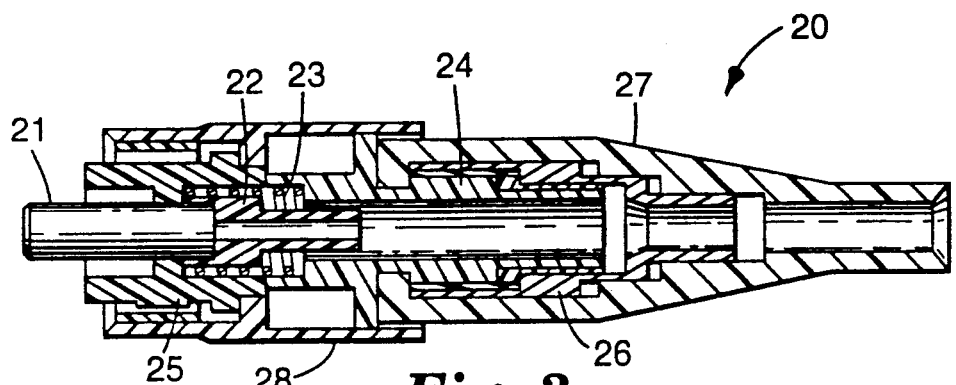
FIG. 3 is a cross-sectional side view of the prior art FC-PC2 connector.
Figure 6:
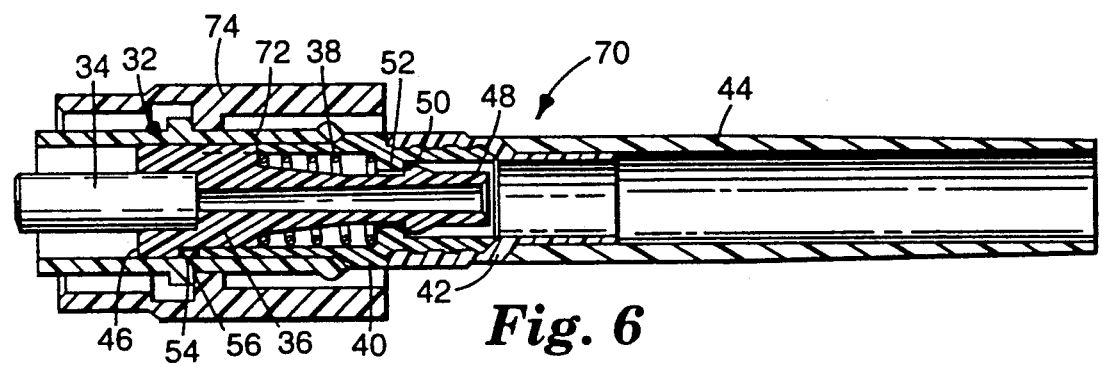
FIG. 6 is a cross-sectional side view of a modified FC connector using the subassembly of FIG. 4.

FIG. 6 further illustrates the highly compatible design of connector subassembly 30 in a modified FC connector 70. Again, FIG. 6 is nearly identical to FIG. 4 except for the addition of a novel FC shell 72 (similar to shell 25 of FIG. 3) and a rotatable housing 74 (identical to housing 28). Shell 72 is attached to subassembly 30 in the exact same manner as the attachment of shell 62 of modified SC connector 60.

The advantages in using the connector system of the present invention already become apparent upon comparison of the prior art SC and FC connectors with the novel designs of FIGS. 5 and 6. The prior art SC and FC connectors required a total of 19 different piece parts, whereas connectors 6D and 70 require only 10 parts. As a further advantage, all of the parts in connector subassembly 30 snap together—there is no need for the C-rings, pins, etc., used in the prior art connectors to hold the various parts in place.

Those skilled in the art will appreciate that FIGS. 5 and 6 are exemplary, and the use of subassembly 30 may be extended to other connector designs. For example, a modified ST connector could be provided, similar to modified FC connector 70, except that shell 72 and housing 74 would be replaced by a shell and housing having the appropriate bayonet-style latching mechanism. Such a modified ST connector is not illustrated since the push-pull variation illustrated in FIG. 8 (described further below) is considered more preferable.

While one advantage of the present invention is the use of common components, those familiar with the manufacture of fiber optic connectors understand that such a simplified system can still benefit by having the flexibility to substitute more customized parts. For example, in FIG. 7 another modified FC connector 70' is shown which is very similar to connector 70, except that connector 70' now includes a body 76 which incorporates certain features of shell 72. More accurately, body 40 and shell 72 have been merged into body 76. While it is a goal of the present invention to minimize the number of overall parts in system for manufacturing different optical connectors, it will be appreciated that the addition of body 76 to the parts list does not actually increase the overall number of parts. This is so because, even if body 40 were retained in the modified FC design, a shell (such as 72) would still be required; therefore, merging body 40 into a new body/shell 76 does not increase the number of overall parts, assuming that only one of the modified FC designs 70 or 70' is used in the connector manufacturing system.

Just as modified FC connector 70 may be provided with an integrated body/shell, a modified SC connector 60', illustrated in FIG. 9, may similarly combine body 40 and shell 62 of modified SC connector 60 into a new body/shell 64. FIG. 9 also depicts the slidable housing 66 used in the SC design. The same discussion above concerning the number of overall parts in the connector system applies to modified SC connector 60', i.e., the provision of an integral body/shell 64 does not increase the overall number of parts, as long as only one of the two designs 60 or 60' is used.

Figure 8:
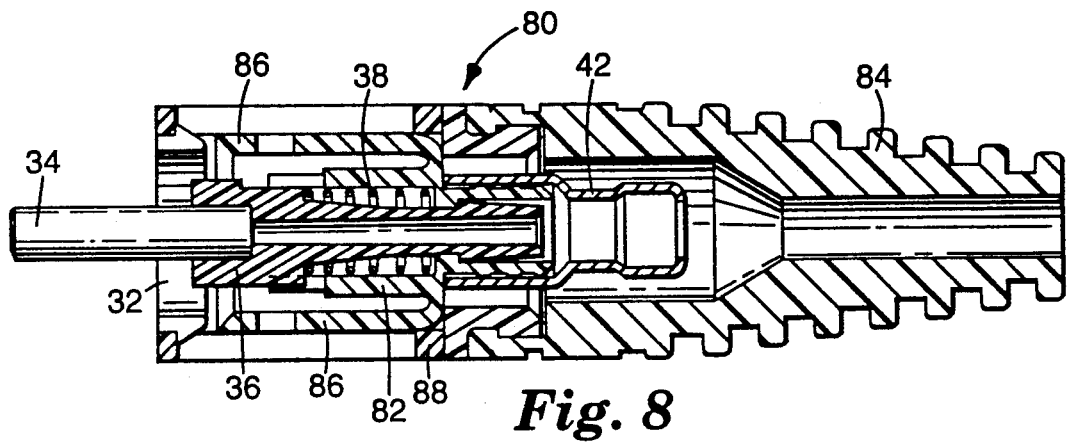
FIG. 8 is a cross-sectional side view of a modified ST push-pull connector using the ferrule/collar assembly of the present invention.

The basic design of ferrule/collar assembly 32 may be extended to other connector formats, even if not all of the components of connector subassembly 30 are used. For example, FIG. 8 illustrates a modified ST push-pull connector 80 which still utilizes ferrule/collar assembly 32, spring 38 and crimp ring 42, but a body 82 and boot 84 are used which are different from the body 40 and boot 44 of connector subassembly 30. A different body is required in order to accommodate the latch members 86 of the ST push-pull design (see U.S. Pat. No. 5,101,463). Modified ST push-pull connector 80 could utilize the common boot 44, but it is deemed preferable to provide a different boot 84 which may be attached to the slidable housing 88 to allow actuation of the housing by pulling on the boot. While connector 80 introduces an additional part to the overall part count of the contemplated manufacturing system, the method of installation of connector so is still the same as with the other connectors of the present invention since body 82 still provides the snap-fit onto extended collar 36.

Figure 7:
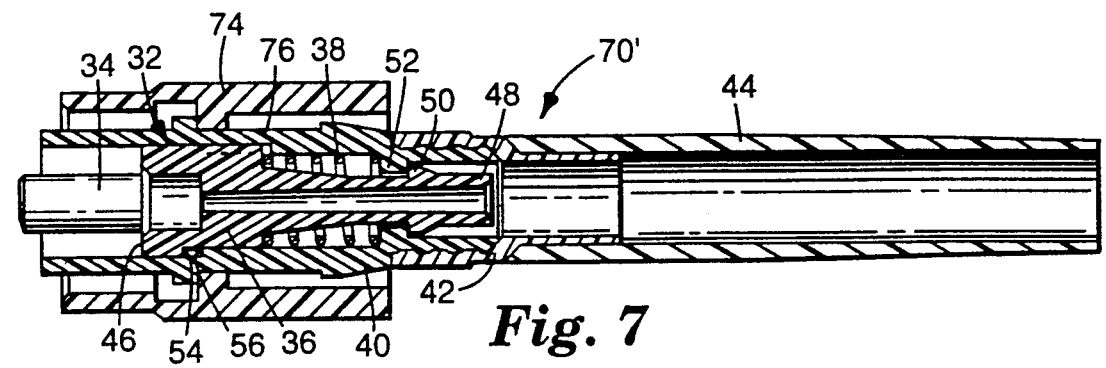
FIG. 7 is a cross-sectional side view of a modified FC connector using a different body from that of FIG. 6.

In the preferred manufacturing system, which includes the connectors of FIGS. 7, 8 and 9, there are a total of only thirteen piece parts, five of which are common to two or more of the designs; this compares with thirty total parts in the equivalent prior art process for manufacturing the FC, SC and ST push-pull connectors, in which none of the thirty parts are common. Streamlining of the components, along with part count reduction for an SC/FC/ST manufacturing system, imparts significant cost savings. It also helps the end user, since there is a nearly identical procedure (including tools, supplies, and measurements) for installing each of the three different connector assemblies. In each case, the fiber optic cable is first threaded through boot 44 (or 84) and crimp ring 42. The terminal end of the optical fiber is prepared (stripped and cleaved), and inserted into end 48 of collar 36, which guides the fiber into ferrule 34. After the fiber is secured in the ferrule, such as with epoxy resin, ring 42 is moved over the end of body 40 (or one of the body/shells 64, 76, 82) and crimped to grip the Kevlar strands against the outside end of the body. The end of the fiber/ferrule may be polished if necessary. This completes preparation of the connector subassembly, and the next step is to snap the subassembly into the appropriate shell (this step is omitted in the preferred constructions wherein the shell and body are integrally formed). The housing (66, 74 or 88) is then placed over the body/shell, if not previously threaded. This completes the connector assembly, except on ST push-pull connector 80 in which the final step is attachment of boot 84 to the end of sliding housing 88. The simplification of the three connector designs individually, and the unification of the designs in piece parts and assembly procedures, present a unique system and constitute a significant advancement over the current state of the art.

While the specific dimensions of the connectors and components described herein may vary considerably depending upon the particular plant requirements, these connectors are the subjects of several technical standards which prescribe certain dimensions, tolerances, etc. Based on these standards, the following approximate dimensions are considered exemplary. Ferrule 34 is 10.5 mm long with a diameter of 2.5 mm. Ferrule collar 36 has an overall length of 14.8 mm, and an outer diameter of 4.6 mm at end 46; its smallest outer diameter (next to flange 50) is 2.3 mm, and the internal bore varies from a maximum inner diameter of 1.4 mm to a minimum inner diameter of 1.0 mm at the ferrule. Body 40, and body/shells 64, 82, are sized to fit the foregoing dimensions. Crimp ring 42 has a overall length of 10.8 mm, with the crimp portion of the ring being 5.4 mm long and having an inner diameter of 4.7 mm. Boot 44 is 25 mm long. Other dimensions (e.g., the size of the holes in latch member 86) are in conformance with the applicable ANSI standards.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A subassembly for an optical fiber connector, comprising:

a hollow connector body adapted to receive one of a plurality of different connector shells, said connector body having first and second ends, an inner surface, and a first flange formed on said inner surface proximate said second end of said connector body;

a ferrule;

means for holding said ferrule, said holding means having first and second ends, said first end receiving said ferrule, and said second end being sufficiently small to allow insertion thereof in said first end of said connector body, said second end of said holding means further including means for securing said holding means in said connector body, and said holding means including a collar having a central portion and a second flange proximate said first end thereof;

means for biasing said holding means towards said first end of said connector body, said biasing means including a spring surrounding said central portion of said collar, said spring having a first end in positive abutment with said first flange, and a second end in positive abutment with said second flange; and crimp means for securing strengthening members of an optical fiber cable to said second end of said connector body.

2. The fiber optic connector subassembly of claim 1 wherein said second end of said holding means and said second end of said connector body terminate in approximately the same plane.

3. The fiber optic connector subassembly of claim 2 wherein said holding means has a longitudinal hole, said hole having a variable diameter, increasing from said first end of said holding means toward said second end thereof.

4. The fiber optic connector subassembly of claim 1 wherein:
said ferrule has a hole therethrough for receiving a terminal end of an optical fiber; and
said holding means further includes means for guiding the terminal end of the optical fiber towards said hole in said ferrule.

5. The fiber optic connector subassembly of claim 1 wherein:
said connector body has an inner surface, and a first flange formed on said inner surface proximate said second end of said connector body; and
said securing means comprises a second flange formed on said second end of said holding means, said second flange having an effective outer diameter which is greater than an effective inner diameter of said first flange.

6. The fiber optic connector subassembly of claim 5 wherein said second end of said holding means and said second end of said connector body terminate in approximately the same plane.

7. The fiber optic connector subassembly of claim 1, wherein said holding means includes means for limiting movement of said holding means towards said crimp means.

8. The fiber optic connector subassembly of claim 1 wherein:
said holding means comprises a collar member having first and seconds ends, and having a bore passing therethrough, said ferrule being attached to said first end of said collar member, and said second end of said collar member being inserted in said connector body.

9. The fiber optic connector subassembly of claim 8 wherein said collar member has a shoulder at said first end thereof, said shoulder being sufficiently large to engage said first end of said connector body and limit movement of said collar member towards said crimp means.

10. The fiber optic connector subassembly of claim 1 further comprising boot means, attached to said second end of said connector body, for relieving strain applied to the optical fiber cable proximate said crimp means.

11. A subassembly for an optical fiber connector, comprising:
a hollow connector body having first and second ends, adapted to receive one of a plurality of different connector shells;
a ferrule;

means for holding said ferrule, said holding means having first and second ends, said first end receiving said ferrule, and said second end being sufficiently small to allow insertion thereof in said first end of said connector body and including means for securing said holding means in said connector body, said second end of said holding means and said second end of said connector body terminating in approximately the same plane, and said holding means having a longitudinal hole, said hole having a variable diameter, increasing from said first end of said holding means toward said second end thereof;

means for biasing said holding means towards said first end of said connector body; and crimp means for securing strengthening members of an optical fiber cable to said second end of said connector body.

12. A fiber optic connector comprising:
a hollow connector body having first and second ends;
a ferrule;
a ferrule collar having first and second ends and a bore passing therethrough, said first end receiving said ferrule, and said second end being sufficiently small to allow insertion thereof in said first end of said connector body, said second end of said collar further including means for securing said collar in said connector body;
means for biasing said collar towards said first end of said connector body;
crimp means for securing strengthening members of an optical fiber cable to said second end of said connector body, said ferrule collar having a shoulder at said first end thereof which is sufficiently large to engage said first end of said connector body and limit movement of said ferrule collar towards said crimp means; and
a connector shell attached to and surrounding said connector body, said connector shell taken from the group consisting of an SC-type connector shell, an ST-type connector shell and an FC-type connector shell.

13. The fiber optical connector of claim 12 further comprising boot means, attached to said second end of said connector body, for relieving strain applied to the optical fiber cable proximate said crimp means.

14. The fiber optical connector of claim 12 wherein each of said shells has an interior surface which is adapted to fit on said connector body.

15. The fiber optical connector of claim 12 wherein said connector shell is integrally formed with said connector body.

16. The fiber optic connector of claim 12 wherein:
said connector body has an inner surface, and a first flange formed on said inner surface proximate said second end of said connector body; and
said securing means comprises a second flange formed on said second end of said ferrule collar, said second flange having an effective outer diameter which is greater than an effective inner diameter of said first flange.

17. The fiber optical connector of claim 12 wherein said ferrule collar includes means for limiting movement of said collar toward said crimp means.

18. A subassembly for an optical fiber connector, comprising:

a hollow connector body having first and second ends, adapted to receive one of a plurality of different connector shells;

a ferrule;

means for holding said ferrule, said holding means having first and second ends, said first end receiving said ferrule, and said second end being sufficiently small to allow insertion thereof in said first end of said connector body and including means for securing said holding means in said connector body, said holding means further including a collar member having first and second ends, and having a bore passing therethrough, said ferrule being attached to said first end of said collar member, and said second end of said collar member being inserted in said connector body;

means for biasing said holding means towards said first end of said connector body; and crimp means for securing strengthening members of an optical fiber cable to said second end of said connector body, said collar member having a shoulder at said first end thereof which is sufficiently large to engage said first end of said connector body and limit movement of said collar member towards said crimp means.

* * * * *